United States Patent
Hsu et al.

(10) Patent No.: US 10,194,079 B2
(45) Date of Patent: Jan. 29, 2019

(54) VEHICLE SURVEILLANCE SYSTEM

(71) Applicant: H.P.B. OPTOELECTRONIC CO., LTD, Taichung (TW)

(72) Inventors: Hsuan-Yueh Hsu, Taichung (TW); Szu-Hong Wang, Taichung (TW)

(73) Assignee: H.P.B. OPTOELECTRONIC CO., LTD., Taichung (TW)

( * ) Notice: Subject to any disclaimer, the term of this patent is extended or adjusted under 35 U.S.C. 154(b) by 77 days.

(21) Appl. No.: 15/394,011

(22) Filed: Dec. 29, 2016

(65) Prior Publication Data
US 2017/0195567 A1 Jul. 6, 2017

(30) Foreign Application Priority Data

Dec. 31, 2015 (TW) .............................. 104144616 A

(51) Int. Cl.
| | |
|---|---|
| *H04N 5/232* | (2006.01) |
| *B60Q 9/00* | (2006.01) |
| *B60R 1/00* | (2006.01) |
| *G06K 9/00* | (2006.01) |

(Continued)

(52) U.S. Cl.
CPC ......... *H04N 5/23238* (2013.01); *B60Q 9/008* (2013.01); *B60R 1/00* (2013.01); *G06K 9/00805* (2013.01); *G06K 9/2036* (2013.01); *G06T 7/521* (2017.01); *B60R 2300/102* (2013.01); *B60R 2300/105* (2013.01); *B60R 2300/303* (2013.01); *B60R 2300/607* (2013.01); *B60R 2300/8033* (2013.01); *G06T 2207/30252* (2013.01)

(58) Field of Classification Search
CPC ..... B60Q 9/008; B60R 1/00; B60R 2300/102; B60R 2300/105; B60R 2300/303; B60R 2300/607; B60R 2300/8033; G06K 9/00805; G06K 9/2036; G06T 2207/30252; G06T 7/521; H04N 5/23238
USPC .......................................................... 348/48
See application file for complete search history.

(56) References Cited

U.S. PATENT DOCUMENTS

| | | | |
|---|---|---|---|
| 2003/0123707 A1* | 7/2003 | Park .................. | G01B 11/2513 382/106 |
| 2012/0062743 A1* | 3/2012 | Lynam .................. | B60Q 9/005 348/148 |

(Continued)

*Primary Examiner* — Jamie J Atala
*Assistant Examiner* — James T Boylan
(74) *Attorney, Agent, or Firm* — Muncy, Geissler, Olds & Lowe, P.C.

(57) ABSTRACT

A vehicle surveillance system is disclosed and includes a plurality of image capturing units, an image processing unit, and a display unit for monitoring a position of at least one target around a vehicle and measuring a distance between the at least one target and the vehicle. The vehicle surveillance system utilizes a space domain determination module, a time domain determination module, and a ground surface elimination module to transform original images of the target around the vehicle into the bird's-eye-view panorama, and further detects variation of an optical pattern incident onto the target through a light beam emitted by a light source so as to effectively remind a driver on the on-going vehicle of the position of the target and the distance, and real-time detect and capture an image of any person approaching the vehicle, thereby achieving driving safety and securing lives and personal properties.

9 Claims, 4 Drawing Sheets

(51) Int. Cl.
  *G06K 9/20*    (2006.01)
  *G06T 7/521*   (2017.01)

(56) References Cited

U.S. PATENT DOCUMENTS

2013/0286193 A1* 10/2013 Pflug .................... B60R 1/00
                                                    348/135
2014/0043439 A1*  2/2014 Sichler ................ G01B 11/25
                                                    348/46
2014/0152823 A1*  6/2014 Breed ................. B60R 25/25
                                                    348/148
2017/0140229 A1*  5/2017 Ogata ............... G06K 9/00805

\* cited by examiner

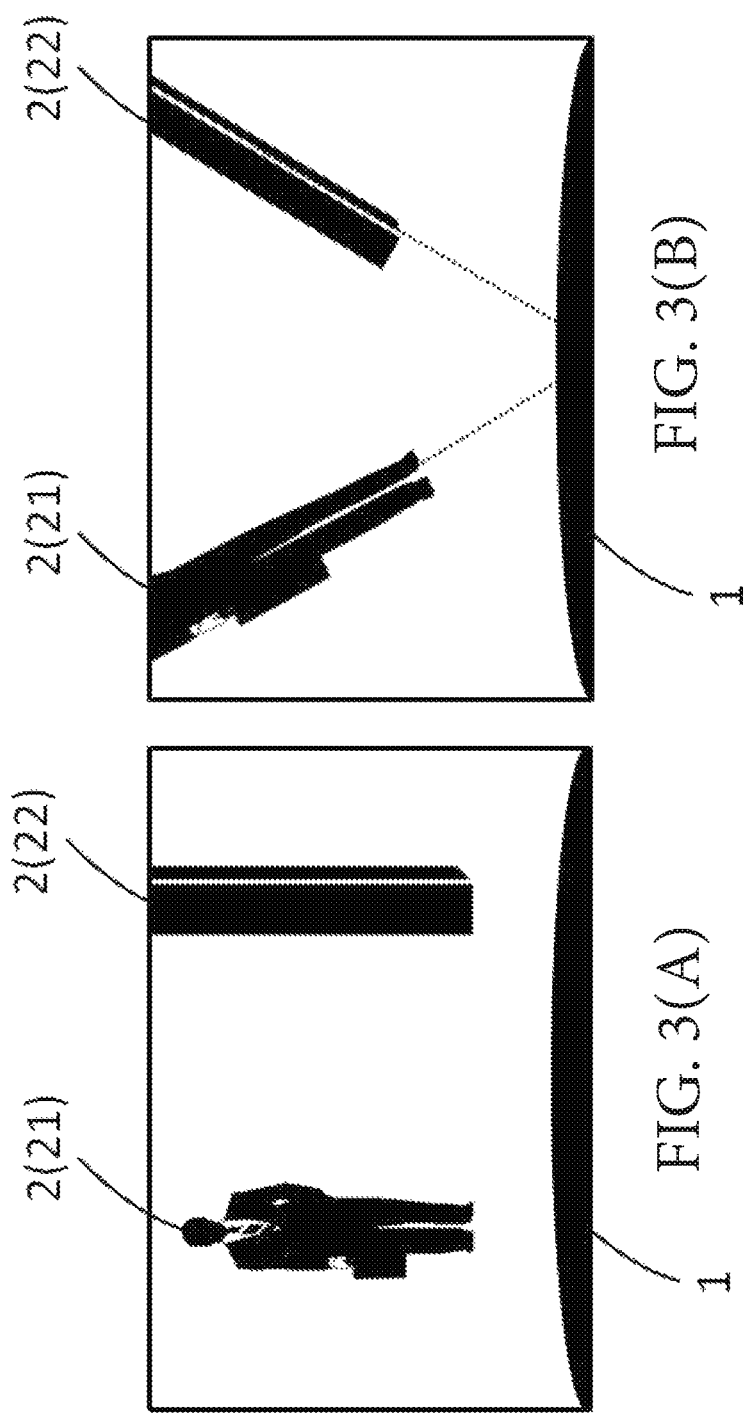

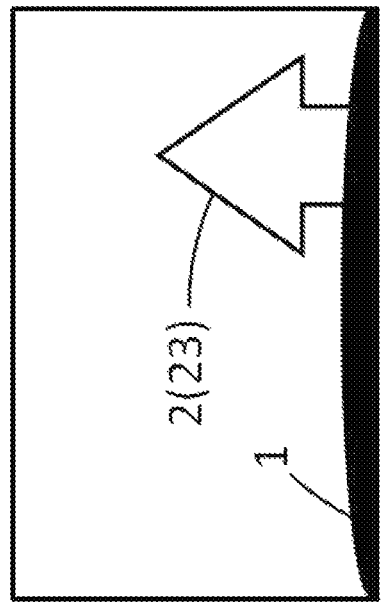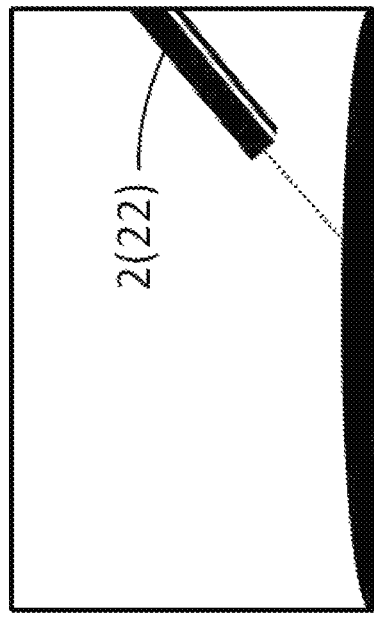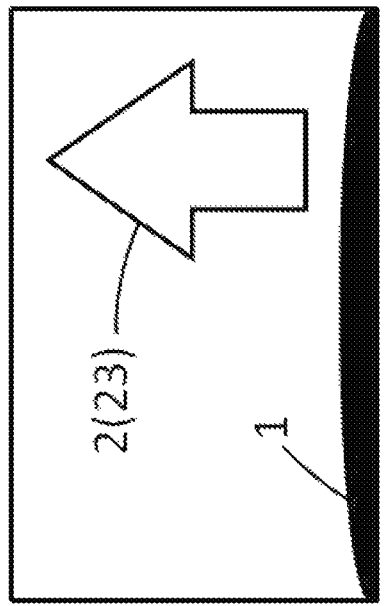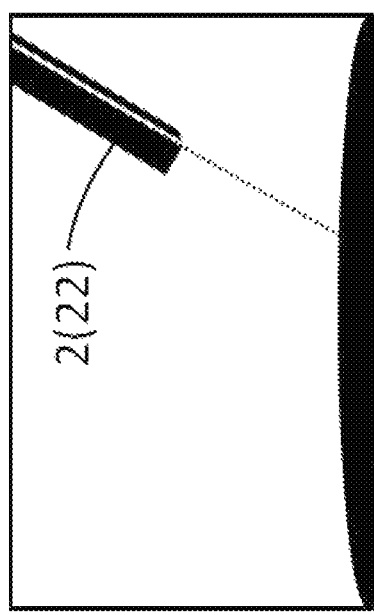

VEHICLE SURVEILLANCE SYSTEM

CROSS-REFERENCE TO RELATED APPLICATION

This application claims the priority of Taiwanese patent application No. 104144616, filed on Dec. 31, 2015, which is incorporated herewith by reference.

BACKGROUND OF THE INVENTION

1. Field of the Invention

The present invention generally relates to a vehicle surveillance system, and more specifically to a vehicle surveillance system utilizing a bird's-eye-view panorama of at least one target around the vehicle and an optical pattern incident on the target to identify the target and further display the distance between the target and the vehicle.

2. The Prior Arts

For now, a traffic carrier has been one the important tools for people's daily life such as business/tourism travel, human or cargo transportation. Vehicles like automobiles are particularly common. However, many drivers perhaps drive into a dead or narrow alley because they are not familiar with the road situation or the vehicle is too huge, especially at bad weather and with dead angle of driving. Also, it is considerably risky for the driver to back the vehicle or make a U-turn in a site crowded with people. At this time, traffic accident events with severe injure likely happen because the driver can not well catch the actual traffic condition around the vehicle. Recently, many solutions for overcoming the above issues have been successfully developed and used. For example, the vehicle is provided with a tradition image capturing device like camera to monitor the surroundings. However, visional dead angle for the driver still exists. It is thus indeed crucial for the related industries of the vehicle detection system to overcome the problems in the prior arts and develop a new hardware design of the vehicle surveillance system, which precisely and overall detects the position and the distance of the target around the vehicle when the vehicle runs on the road, and further real-time captures the image of any person approaching the vehicle when the vehicle stops still so as to achieve driving safety and securing lives and properties.

SUMMARY OF THE INVENTION

The primary objective of the present invention is to provide a vehicle surveillance system, which utilizes a bird's-eye-view panorama of the target around the vehicle and an optical pattern incident on the target to identify the target, and further displays the distance between the target and the vehicle. In particular, a space domain determination module, a time domain determination module, and a ground surface elimination module are primarily employed by the vehicle surveillance system of the present invention to perform specific detection means such that the original image of the target around the vehicle is transformed into the bird's-eye-view panorama. In addition, variation of the optical pattern on the target from the light source is effectively used to remind the driver of the distance between the target and the vehicle, and the real-time image is provided when any person approaches the vehicle parking still. Therefore, driving safety and securing lives and properties are achieved.

To achieve the above objective, the vehicle surveillance system is provided to monitor at least one target around the vehicle through a bird's-eye-view panorama, and substantially comprises a plurality of image capturing units, an image processing unit, and a display unit. The plurality of image capturing units is provided on an outer surface of the vehicle, and each image capturing unit comprises a light source, a capturing lens, and an optical sensor. The light source emits a light beam onto the target to show an optical pattern, the optical pattern varies as the distance between the target and the vehicle changes, and an original image of the target around the vehicle and the optical pattern on the target passes through the capturing lens and is incident onto the optical sensor. The image processing unit is electrically connected to the plurality of image capturing units, and each image processing unit comprises a distance detection module, a transformation module, a space domain determination module, a time domain determination module, and a ground surface elimination module. The distance detection module calculates the distance between the target and the vehicle based on variation of the optical pattern, the transformation module transforms the original images into a plurality of bird's-eye-view images, respectively, the space domain determination module determines if any information about the bird's-eye-view image including the target exists, the time domain determination module utilizing local difference (LD) for two successive original images to find an outline of the target, and the ground surface elimination module determines a difference between the target and a ground surface in two successive bird's-eye-view images. The display unit is electrically connected to the image processing unit and comprises a display module and an alarm module. The display module displays the bird's-eye-view panorama incorporating the bird's-eye-view images, and the distance between the target and the vehicle, and the alarm module sends an alarm signal when the distance is less than a threshold.

As for the image detection system of the present invention, the light source is a laser emitter, an infrared device, a light emitting device (LED), or any phosphor generating the light beam.

As for the image detection system of the present invention, the optical pattern is a template of a grid, a straight line, or a plurality of dots regularly arranged.

As for the image detection system of the present invention, the capturing lens is a fish-eye lens, a wide angle lens or a standard lens.

As for the image detection system of the present invention, the optical sensor is a charge coupled device (CCD) or a complementary metal-oxide-semiconductor (CMOS) device.

As for the image detection system of the present invention, local difference (LD) employed in the time domain determination module is specified by equation 1:

$$LD = \frac{1}{16} \sum_{m=-1}^{1} \sum_{n=-2}^{2} |I^t(x+m, y+n) - I^{t-1}(x+m, y+n)|, \qquad \text{equation 1}$$

m and n are coordination for the image to form a mask, $I^t(x+m, y+n)$ is a function of image at time t, $I^{t-1}(x+m, y+n)$ is a function of image at time t−1, the threshold $D_{th}$ is specified by the following equation 2:

$$D_{th} = 256_1(LD \times th) \qquad \text{equation 2,}$$

th is adjusted according to variation of the image, LD is inversely proportional to $D_{th}$, and the relationship between a range of difference (Temp Diff), and the $D_{th}$ is shown by equation 3:

$$Temp\ Diff = \begin{cases} 0, |I^t(x,y) - I^{t-1}(x,y)| < D_{th} \\ 255, |I^t(x,y) - I^{t-1}(x,y)| \geq D_{th} \end{cases} \quad \text{equation 3}$$

As for the image detection system of the present invention, the display module is a display device, a smart phone, a tablet computer, a portable computer provided with a display screen, or a combination of the above devices.

As for the image detection system of the present invention, the alarm signal is sound, light, vibration, or a combination of the above means.

As for the image detection system of the present invention, the light source is a flickering light source with a flickering frequency the same as a capturing frequency of the capturing lens.

As for the image detection system of the present invention, the distance detection module further compares a former image and a latter image captured by the capturing lens and acquires the difference between the two images to determine variation of the optical pattern.

Therefore, the vehicle surveillance system of the present invention employs the space domain determination module, the time domain determination module, and the ground surface elimination module to perform specific detection means such that the original image of the target around the vehicle is transformed into the bird's-eye-view panorama. In addition, variation of the optical pattern on the target from the light source is effectively used to remind the driver of the distance between the target and the vehicle, and the real-time image is provided when any person approaches the vehicle when the vehicle stops still, thereby achieving advantages of driving safety and securing lives and properties. Furthermore, the display unit of the present invention provided an the vehicle is used to display the bird's-eye-view panorama formed by incorporating the bird's-eye-view images for detecting the current status of the at least one target around the vehicle so as to effectively remind the driver of the position of the target and the distance between the target and the vehicle and greatly improve driving safety. Also, variation of the optical pattern emitted by the light source in collocation with the bird's-eye-view panorama is utilized to detect the position of the target and the distance between the target and the vehicle such that the real-time image of any person approaching the vehicle while the vehicle stops still, and lives and personal properties are secured. Finally, the light beam and the optical pattern emitted by the light source like infrared or laser may serve as an auxiliary light source for the environment with insufficient illumination like night such that the image capturing unit effectively performs image capturing and achieves 24 hours continuous operation.

BRIEF DESCRIPTION OF THE DRAWINGS

The present invention will be apparent to those skilled in the art by reading the following detailed description of a preferred embodiment thereof, with reference to the attached drawings, in which:

FIGS. 3(A) and 3(B) are views showing the space domain determination module of the vehicle surveillance system according to the present embodiment; and FIGS. 4(A) to 4(D) are views showing the ground surface elimination module of the vehicle surveillance system according to the present embodiment.

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

Figure 1:
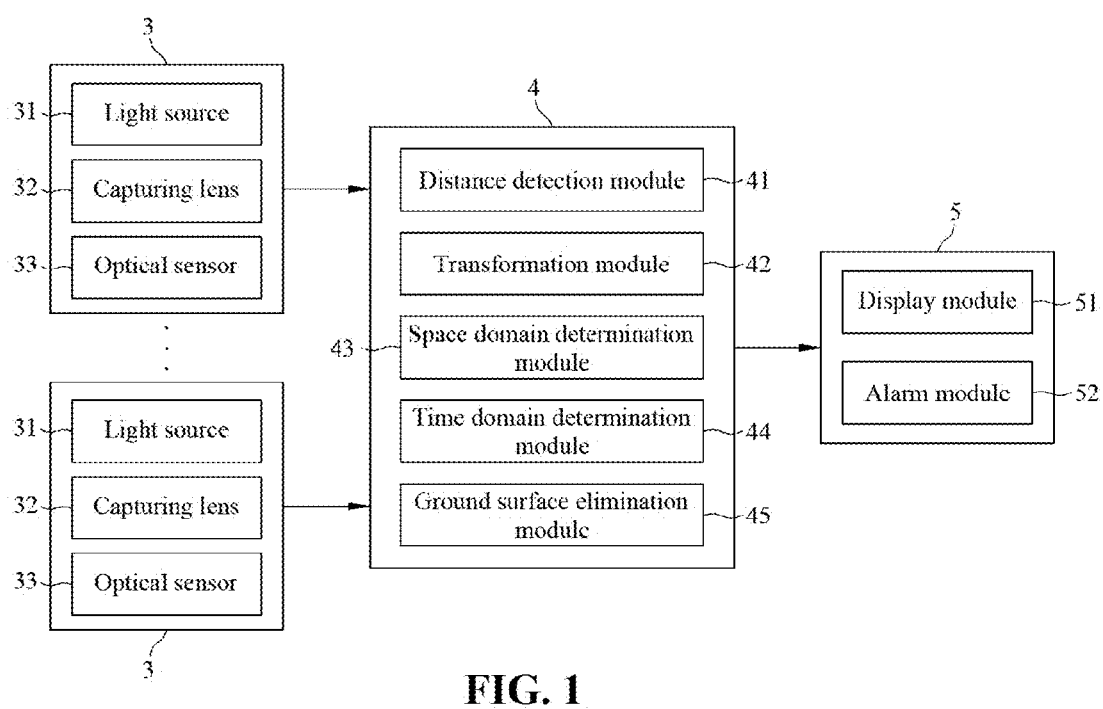
FIG. 1 is a view showing the functional block diagram of the vehicle surveillance system according to one embodiment of the present invention.
Figure 2:
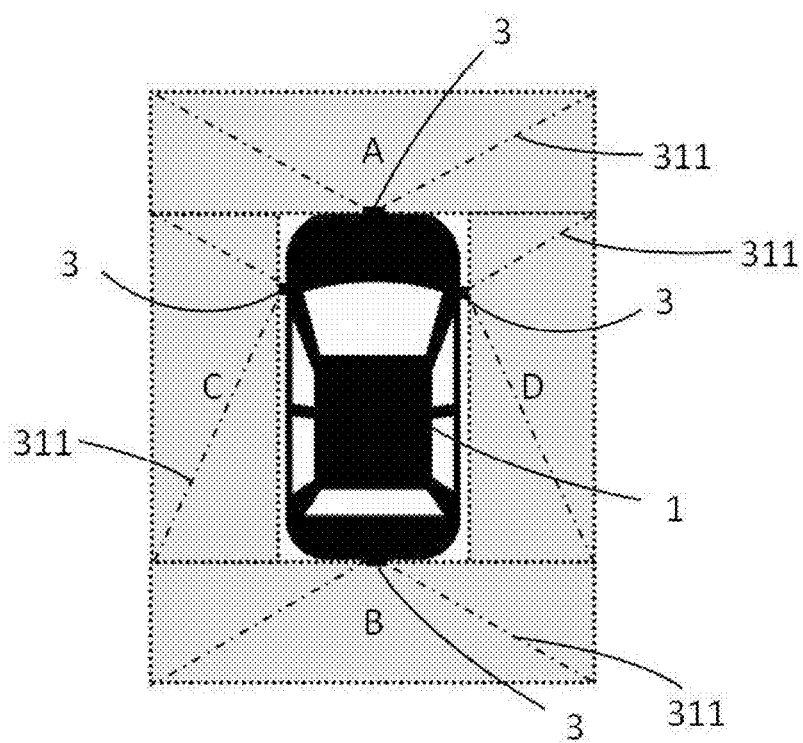
FIG. 2 is a view showing the image capturing unit of the vehicle surveillance system according to the present embodiment.

First, refer to FIGS. 1 and 2 illustrating the functional block diagram of the vehicle surveillance system and the image capturing unit according to one embodiment of the present invention, respectively. The vehicle surveillance system of the present invention monitors at least one target 2 around the vehicle 1 through a bird's-eye-view panorama, and comprises a plurality of image capturing units 3, an image processing unit 4, and a display unit 5.

Specifically, the image capturing units 3 are provided on an outer surface of the vehicle 1, and each image capturing unit 3 comprises a light source 31, a capturing lens 32, and an optical sensor 33. The light source 31 emits a light beam 311, which is incident onto the target 2 to show an optical pattern. The optical pattern varies as the distance between the target 2 and the vehicle 1 changes. An original image of the target 3 around the vehicle 1 and the optical pattern on the target 3 is captured by the capturing lens 32 and further incident onto the optical sensor 33. The light source 31 is preferably implemented by a laser emitter, an infrared device, a light emitting device (LED), or any phosphor generating the light beam 311. The optical pattern is a template of a grid, a straight line, or a plurality of dots regularly arranged. In one exemplary example of the present invention, the light source 31 is a laser source emitting a laser beam as the light beam as desired, and the optical pattern of the grid template is formed on the target 2. In addition, the capturing lens 32 is a fish-eye lens, a wide angle lens or a standard lens, and the optical sensor 33 is a charge coupled device (CCD) or a complementary metal-oxide-semiconductor (CMOS) device. It is preferred that the capturing lens 32 is the fish-eye lens and the optical sensor 33 is the CCD. The vehicle surveillance system of the present invention provides four fish-eye lens as the capturing lens 32 on the front, back, left, and right sides of the vehicle 1, respectively, to capture and transfer the image around the vehicle 1 to the CCD to form a first image A, a second image B, a third image C, and a fourth image D. However, it should be noted that the number of the capturing lens 32 as mentioned above is only illustrative for explaining the aspects of the present invention, and not intended to limit the scope of the present invention. Thus, those skilled in the technical field know that the vehicle 1 should be appropriately provided with a specific number of the capturing lens 32 according to a different size, and the feature of the present invention is not affected.

The image processing unit 4 is electrically connected to the image capturing units 3, and each image processing unit 4 comprises a distance detection module 41, a transformation module 42, a space domain determination module 43, a time domain determination module 44, and a ground surface elimination module 45. Specifically, the distance detection module 41 calculates the distance between the target 2 and the vehicle 1 based on variation of the optical pattern, the transformation module 42 transforms the original images into a plurality of bird's-eye-view images, respectively, the space domain determination module 43 determines if any information about the bird's-eye-view image including the target 2 exists, the time domain determination module 44 utilizes local difference (LD) for two successive original images to find an outline of the target 2, and the ground surface elimination module 45 determines a difference between the target 2 and a ground surface in two successive bird's-eye-view images.

The display unit 5 is electrically connected to the image processing unit 4 and comprises a display module 51 and an alarm module 52. The display module 51 is configured to display the bird's-eye-view panorama incorporating the bird's-eye-view images, and the distance between the target 2 and the vehicle 1. The alarm module 52 sends an alarm signal when the distance is less than a threshold. Moreover, the display module 51 is a display device, a smart phone, a tablet computer, a portable computer provided with a display screen, or any combination of the above devices. The alarm signal is sound, light, vibration, or any combination of the above means. In the preferred embodiment of the present invention, if each of the four bird's-eye-view panoramas contains the target 2, the display module 51 is intended to display the distance between the nearest target 2 and the vehicle 1.

In addition, the feature about the distance detection module 41 effectively determining the distance between the target 2 and the vehicle 1 based on variation of the optical pattern is disclosed in the patent specification applied to Intellectual Property Office, Taiwan, on Dec. 17, 2015. Thus, the detailed description is omitted hereinafter. More specifically, the space domain determination module 43 employs radial edge detection to determine the information that the target 2 exists. Please refer to FIGS. 3(A) and 3(B), which show one exemplary operation of the space domain determination module 43 of the vehicle surveillance system according to the present embodiment. Assuming one person 21 and one pillar 22 are two targets 2 standing in front of the vehicle 1. FIG. 3(A) shows the original image of the targets 2 displayed by the display module 51, and FIG. 3(B) reveals the information that the targets 2 exist in the bird's-eye-view panorama through radial edge detection, wherein the elongated lines of the person 21 and the pillar 22 in the panorama are directed toward the position of the fish-eye lens of the image capturing unit 3. Since radial edge detection is well known in the prior arts, the detailed description is thus omitted. Further, the time domain determination module 44 finds the outline of the target 2 by means of local difference (LD) for two successive original images, and the following equation 1 is used for LD:

$$LD = \frac{1}{16} \sum_{m=-1}^{1} \sum_{n=-2}^{2} |I^{t}(x+m, y+n) - I^{t-1}(x+m, y+n)|, \quad \text{equation 1}$$

where m and n are coordination for the image to form a mask, $I^{t}(x+m, y+n)$ is a function of image at time t, and $I^{t-1}(x+m, y+n)$ is a function of image at time t−1. Further, the threshold $D_{th}$ is specified by the following equation 2:

$$D_{th} = 256_{1}(LD \times th) \quad \text{equation 2,}$$

where th is adjusted according to variation of the image, and LD is inversely proportional to $D_{th}$. The relationship between a range of difference (Temp Diff) and the $D_{th}$ is shown by equation 3:

$$\text{Temp Diff} = \begin{cases} 0, & |I^{t}(x, y) - I^{t-1}(x, y)| < D_{th} \\ 255, & |I^{t}(x, y) - I^{t-1}(x, y)| \geq D_{th} \end{cases}. \quad \text{equation 3}$$

Moreover, the ground surface elimination module 44 determines a difference between the target 2 and a ground surface in two successive bird's-eye-view images. Please refer to FIGS. 4(A) to 4(D) showing the exemplary operation of the ground surface elimination module of the vehicle surveillance system according to the present embodiment. FIGS. 4(A) and 4(C) are the bird's-eye-view images of a ground label 23 and the post 22 as the targets 2 at time t, respectively, and FIGS. 4(B) and 4(D) are the bird's-eye-view images of the ground label 23 and the post 22 at time t+1, respectively. As the vehicle 1 runs forward, one specific point of the image of the ground label 23 is not distorted at time t and t+1, but the post 22 shows some angle distortion. Therefore, the difference between the target 2 and the ground surface is well determined from the two successive panoramas through motion prediction of the ground surface elimination module 44, and the information about the target 2 is acquired.

Additionally, in another embodiment of the present invention, the light source 31 is a flickering light source, which has a flickering frequency the same as the capturing frequency of the capturing lens 32. The distance detection module 41 compares the former and latter images captured by the capturing lens 32 and acquires the difference between two images to determine variation of the optical pattern. In other words, when the light source 31 illuminates, the capturing lens 32 captures one image including the target 2 and the optical pattern on the target 2 at one time, and when the light source 31 stops illuminating, the capturing lens 32 captures another image including the same target 2 and the optical pattern on the target 2 at the next time. After the distance detection module 41 subtracts the latter image from the former image, only the image of the optical pattern remains for specifically determining the type of variation of the optical pattern and calculating the distance between the target 2 and the vehicle 1.

Next, to further understand the objective, the aspect and the function of the present invention, an illustrative example is described in more detail in the following, but not intended to limit the application field of the present invention. When a driver drives a vehicle on the road, the vehicle surveillance system of the present invention provided on the vehicle is used to remind the driver of the position of the target around the vehicle, and the distance between the target and the vehicle, and when the vehicle stops still, the present invention may further real-time detect the image of any person approaching the vehicle. Therefore, those advantages of improving safety of driving and securing lives and properties are achieved. First of all, each of the light sources 31 built in four image capturing units 3 emits the light beam 311 onto the target 2 to show the optical pattern. The optical pattern varies as the distance between the target 2 and the vehicle 1 changes. Four image capturing units 3 are provided at the front, back, left, and right sides of the vehicle 1, respectively. Then, the capturing lens 32 built in the image capturing unit 3 like a fish-eye capturing lens is used to capture an original image including the target 2 around the vehicle 1 and the optical pattern on the target 2, and the original image is formed on the corresponding optical sensor 33 like a CCD. Next, the distance detection module 41 built in the image processing unit 4 calculates the distance between the target 2 and the vehicle 1 based on variation of the optical pattern. The transformation module 42 built in the image processing unit 4 transforms the original images into a plurality of bird's-eye-view images, respectively. The space domain determination module 43 built in the image processing unit 4 employ radial edge detection to determine if any information about the bird's-eye-view image including the target 2 exists. The time domain determination module 44 of the image processing unit 4 utilizes local difference (LD) for two successive original images to find an outline of the target 2, and the ground surface elimination module 45 then determines the difference between the target 2 and a ground surface in two successive bird's-eye-view images through motion prediction. Finally, the display module 51 built in the display unit 5 displays the bird's-eye-view panorama incorporating the bird's-eye-view images, and the distance between the target 2 and the vehicle 1. Once the distance between the target 2 and the vehicle 1 is less than a preset threshold, the alarm module 52 sends an alarm signal to remind and warn the driver. The vehicle surveillance system of the present invention employs the space domain determination module 43, the time domain determination module 44, and the ground surface elimination module 45 to perform specific detection means such that the original image of the target 2 around the vehicle 1 is transformed into the bird's-eye-view panorama. In addition, variation of the optical pattern on the target 2 from the light source 31 is effectively used to remind the driver of the distance between the target 2 and the vehicle 1, and the real-time image is provided when any person approaches the vehicle 1 when the vehicle 1 stops still. Therefore, driving safety and securing lives and personal properties are achieved.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A vehicle surveillance system for monitoring a position of at least one target around a vehicle and measuring a distance between the at least one target and the vehicle by means of bird's-eye-view panorama, comprising:
a plurality of image capturing units provided on an outer surface of the vehicle, the image capturing unit comprising a light source, a capturing lens, and an optical sensor, the light source emitting a light beam onto the target to show an optical pattern, the optical pattern varying as the distance between the target and the vehicle changing, an original image of the target around the vehicle and the optical pattern on the target captured by the capturing lens and incident onto the optical sensor;
an image processing unit electrically connected to the plurality of image capturing units, the image processing unit comprising a distance detection module, a transformation module, a space domain determination module, a time domain determination module, and a ground surface elimination module, the distance detection module calculating the distance between the target and the vehicle based on variation of the optical pattern, the transformation module transforming the original images from the image capturing units into a plurality of bird's-eye-view images, respectively, the space domain determination module determining if any information about the bird's-eye-view image including the target exists, the time domain determination module utilizing local difference (LD) for two successive original images to find an outline of the target, the ground surface elimination module determining a difference between the target and a ground surface in two successive bird's-eye-view images; and
a display unit electrically connected to the image processing unit and comprising a display module and an alarm module, the display module displaying the bird's-eye-view panorama incorporating the bird's-eye-view images, and the distance between the target and the vehicle, the alarm module sending an alarm signal in case of the distance less than a threshold, wherein the local difference (LD) employed in the time domain determination module is specified by equation 1:

$$LD = \frac{1}{16} \sum_{m=-1}^{1} \sum_{n=-2}^{2} |I^t(x+m, y+n) - I^{t-1}(x+m, y+n)|, \quad \text{equation 1}$$

m and n are coordination for the image to form a mask, $I^t(x+m, y+n)$ is a function of image at time t, $I^{t-1}(x+m, y+n)$ is a function of image at time t−1, the threshold $D_{th}$ is specified by the following equation 2:

$$D_{th} = 256|(LD \times th) \quad \text{equation 2,}$$

th is adjusted according to variation of the image, LD is inversely proportional to $D_{th}$, and the relationship between a range of difference (Temp Diff), and the $D_{th}$ is shown by equation 3:

$$\text{Temp Diff} = \begin{cases} 0, & |I^t(x, y) - I^{t-1}(x, y)| < D_{th} \\ 255, & |I^t(x, y) - I^{t-1}(x, y)| \geq D_{th} \end{cases}. \quad \text{equation 3}$$

2. The vehicle surveillance system as claimed in claim 1, wherein the light source is a laser emitter, an infrared device, a light emitting device (LED), or a phosphor generating the light beam.

3. The vehicle surveillance system as claimed in claim 1, wherein the optical pattern is a template of a grid, a straight line, or a plurality of dots.

4. The vehicle surveillance system as claimed in claim 1, wherein the capturing lens is a fish-eye lens, a wide angle lens or a standard lens.

5. The vehicle surveillance system as claimed in claim 1, wherein the optical sensor is a charge coupled device (CCD) or a complementary metal-oxide-semiconductor (CMOS) device.

6. The vehicle surveillance system as claimed in claim 1, wherein the display module is a display device, a smart phone, a tablet computer, a portable computer provided with a display screen.

7. The vehicle surveillance system as claimed in claim 1, wherein the alarm signal is sound, light, vibration, or any combination thereof.

8. The vehicle surveillance system as claimed in claim 1, wherein the light source is a flickering light source with a flickering frequency the same as a capturing frequency of the image capturing unit.

9. The vehicle surveillance system as claimed in claim 8, wherein the distance detection module compares a former image and a latter image captured by the image capturing unit, and acquires the difference between the two images to determine variation of the optical pattern.

\* \* \* \* \*